US009098429B2

(12) United States Patent
Varanda et al.

(10) Patent No.: US 9,098,429 B2
(45) Date of Patent: *Aug. 4, 2015

(54) UNIVERSAL PERIPHERAL CONNECTOR

(71) Applicant: BlackBerry Limited, Waterloo (CA)

(72) Inventors: Marcelo Varanda, Ottawa (CA); Thanh Vuong, Ottawa (CA); Luis Estable, Ottawa (CA)

(73) Assignee: BlackBerry Limited, Waterloo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/047,617

(22) Filed: Oct. 7, 2013

(65) Prior Publication Data

US 2014/0040522 A1 Feb. 6, 2014

Related U.S. Application Data

(63) Continuation of application No. 13/209,680, filed on Aug. 15, 2011, now Pat. No. 8,554,971, which is a continuation of application No. 11/203,198, filed on Aug. 15, 2005, now Pat. No. 8,024,500.

(51) Int. Cl.
*G06F 13/12* (2006.01)
*G06F 13/14* (2006.01)
*G06F 13/10* (2006.01)
*G06F 1/16* (2006.01)
*G06F 13/40* (2006.01)

(52) U.S. Cl.
CPC ............ *G06F 13/102* (2013.01); *G06F 1/1632* (2013.01); *G06F 1/1698* (2013.01); *G06F 13/409* (2013.01)

(58) Field of Classification Search
CPC ............................. G06F 1/1632; G06F 1/1698
See application file for complete search history.

(56) References Cited

U.S. PATENT DOCUMENTS

| 5,784,581 A | 7/1998 | Hannah |
| 7,000,057 B1 | 2/2006 | Novell et al. |
| 2002/0101965 A1 | 8/2002 | Elzur |

(Continued)

FOREIGN PATENT DOCUMENTS

| EP | 1096372 | 5/2001 |
| JP | 20050103992 | 4/2005 |

(Continued)

OTHER PUBLICATIONS

Alan Simpson, Windows XP Bible, 2001, Hungry Minds.*

(Continued)

*Primary Examiner* — Hyun Nam
(74) *Attorney, Agent, or Firm* — Moffat & Co.

(57) ABSTRACT

A universal connector apparatus for a mobile device and in communication with the mobile device, the apparatus comprising: at least one universal serial bus (USB) connector providing at least one connection; at least one USB host controller configured to control the at least one USB connection; a microprocessor configured to control the at least one USB host controller, the microprocessor having an operating system; a USB device control interface on the mobile device configured to communicate and control the universal connector apparatus; and a USB driver configured to operate within the operating system to enable the mobile device to connect to one or more peripherals via the at least one USB connector.

7 Claims, 6 Drawing Sheets

(56) References Cited

U.S. PATENT DOCUMENTS

| | | |
|---|---|---|
| 2004/0029409 A1 | 2/2004 | Moon et al. |
| 2005/0135393 A1* | 6/2005 | Benco et al. ................. 370/408 |
| 2005/0154787 A1 | 7/2005 | Cochran et al. |
| 2006/0020723 A1* | 1/2006 | Chia-Chun .................... 710/62 |
| 2006/0067209 A1 | 3/2006 | Sheehan et al. |
| 2006/0135138 A1* | 6/2006 | Lazaridis ..................... 455/417 |

FOREIGN PATENT DOCUMENTS

| | | |
|---|---|---|
| JP | 20020055936 | 1/2008 |
| WO | 2004/029817 A1 | 4/2004 |

OTHER PUBLICATIONS

"Introduction to USB On-The-Go".

* cited by examiner

UNIVERSAL PERIPHERAL CONNECTOR

CROSS REFERENCE TO RELATED APPLICATIONS

The present application is a continuation of U.S. application Ser. No. 13/209,680, filed Aug. 15, 2011, which is a continuation of U.S. Pat. No. 8,024,500, filed Aug. 15, 2005, and issued Sep. 20, 2011, the contents of all of which is incorporated herein by reference.

FIELD OF THE APPLICATION

The present application relates generally to the field of wireless communication devices and, in particular, to a connector to connect the wireless communication device with a peripheral device.

BACKGROUND

Many mobile data devices, such as wireless data devices, personal digital assistants, smart phones and cellular telephones, include a universal serial bus (USB) interface. The USB is used for a variety of functions but is primarily designed to connect the mobile data device with a computer.

The connection of a mobile data device to a computer allows the mobile data device to be a client and the computer to be the USB server. However, in many cases, it would be also desirable to connect the data device to a USB peripheral. Such peripherals include, for example, input devices, printers, cameras, mass storage devices, projectors, as well as many other peripherals known to those skilled in the art.

The problem with connecting a mobile data device to a peripheral is that the mobile data device would have to become the USB server. In current mobile data devices, the device is configured to connect to a USB host and not to a USB peripheral device. There is therefore a need to enable connectivity between a mobile data device and a USB peripheral device utilizing an existing USB port on the mobile data device.

Attempts have been made to solve the above problem. New data devices may include a technology labelled as USB On-The-Go. The problem with USB On-The-Go is that it requires at least USB 2.0 in order to work. Many existing mobile data devices do not include this version of USB ports and therefore a solution is required that will work with all mobile data devices.

BRIEF DESCRIPTION OF THE DRAWINGS

The present apparatus and method will be better understood with reference to the drawings in which.

DETAILED DESCRIPTION

Figure 1:
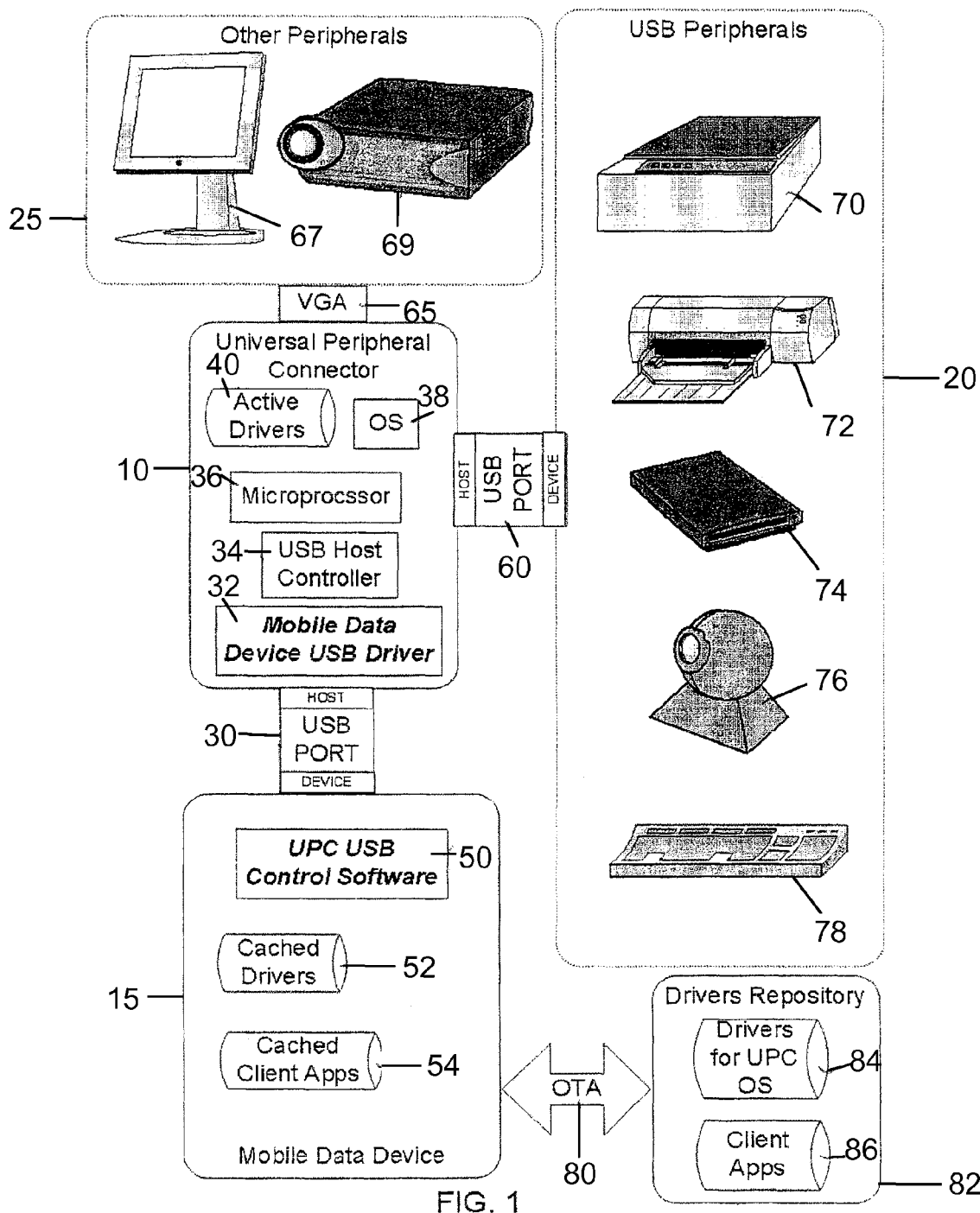
FIG. 1 is a block diagram of an exemplary universal peripheral connector connected to a mobile data device and to various peripherals.

The present method and apparatus provide a USB peripheral connector to connect the mobile data device to a variety of peripherals. A universal peripheral connector apparatus is provided which includes at least one USB port, a controller to control the one USB port, a microprocessor configured to control the USB host controller, a USB driver for a mobile data device, wherein the USB driver is configured to operate within the operating system operating on the microcontroller and further is configured to enable the mobile data device to connect to one or more peripherals using the universal peripheral connector apparatus.

The universal peripheral connector apparatus can include a number of known standard interfaces to support peripherals. Besides USB this could include for example a VGA port to enable a mobile data device to display the user interface of the data device on the VGA screen or to connect to a peripheral such as an overhead projector for making presentations.

The universal peripheral connector can be a stand-alone device connecting to the mobile data device through a standard USB cable or could include a cradle to hold the mobile data device. The cradle could have a USB connector built in so that when a user inserts the mobile data device into the cradle, the cradle is connected to the mobile data device through the USB port. Peripherals can then be connected to the cradle using other ports on the cradle, such as a USB or a VGA port. The above is not meant to be limited to a cradle or on the stand-alone USB peripheral connector, and one skilled in the art would realize that other type supports could be used.

The universal peripheral connector could be used by connecting it to a mobile data device. The universal peripheral connector could then detect the presence of the USB peripheral at the USB port. Further, if a peripheral is detected, the universal peripheral connector can determine whether or not a driver exists for that peripheral. If a driver does not exist, then a driver can be obtained. Because the mobile data device communicates over the air, if the driver is not stored in either the universal peripheral connector or the mobile data device, then it can be obtained over the air from a driver repository that the mobile data device knows about. Once the driver is obtained and loaded, it can be used to drive the peripheral device.

The present application therefore provides a universal connector apparatus for a mobile device and in communication with the mobile device, the apparatus comprising: at least one universal serial bus (USB) connector providing at least one connection; at least one USB host controller configured to control the at least one USB connection; a microprocessor configured to control said at least one USB host controller, the microprocessor having an operating system; a USB device control interface on said mobile device configured to communicate and control said universal connector apparatus; and a USB driver configured to operate within said operating system to enable said mobile device to connect to one or more peripherals via said at least one USB connector.

The present application further provides a method of connecting and facilitating control of a universal serial bus (USB) peripheral from a mobile device using a universal connector apparatus, the method comprising the steps of: detecting at the connector apparatus the connection or presence of a USB peripheral; if the peripheral is the mobile device configuring the mobile device for remote control of the universal connector; and if the peripheral device is not the mobile device, configuring the mobile device if connected for remote control of the universal connector; locating a driver for said peripheral; and driving said peripheral using said driver to provide a functional feature at the mobile device.

Reference is now made to the drawings. FIG. 1 shows a universal peripheral connector 10 for connecting a mobile data device 15 with a USB peripheral 20 or another peripheral 25. Since many mobile devices 15 do not include a USB port that can be a host USB port, universal peripheral connector 10 is required in order to connect the mobile data device 15 to a peripheral 20. Universal peripheral connector 10 is connected to mobile data device through a USB connection 30. As will be appreciated by those skilled in the art, USB connection 30 can either be a USB cable, a connector connecting directly to mobile data device 15, or other known connection.

Universal peripheral connector 10 includes a mobile data device USB driver 32 for use in driving USB connection 30 to communicate with mobile data device 15.

Universal peripheral connector 10 further includes a USB host controller 34 in order to control the USB port or USB ports on the universal peripheral connector. Since the universal peripheral connector can connect to USB peripherals or other peripherals, at least one USB port is included on universal peripheral controller, but multiple ports could exist.

A microprocessor 36 on universal peripheral connector 10 is configured to control the USB host controller and an operating system 38 is adapted to execute on the microprocessor.

Universal peripheral connector 10 may further include a number of active drivers 40 which are the commonly used drivers to drive USB and other peripherals.

Mobile data device 15, an exemplary version of which is described in more detail below, includes a UPC USB control software module 50 that is used to control the universal peripheral connector. Thus, even though the mobile data device is the client device for the universal peripheral connector's host USB port, control of the universal peripheral connector lies within the mobile data device.

Mobile data device 15 further includes cached drivers 52 which are stored to provide universal peripheral connector 10 with drivers necessary to drive various USB and other peripherals. Cached drivers 52 could be uploaded into universal peripheral connector if universal peripheral connector 10 does not include the driver in its active drivers module 40.

As is described in more detail below, mobile data device 15 further includes cached client applications 54 which are used to exchange data with the USB and other peripherals.

Universal peripheral connector 10 preferably includes a USB connector 60 to connect with a USB peripheral 20. Multiple connectors 60 could exist for universal peripheral connector 10.

As illustrated in FIG. 1, a VGA port 65 is also optionally a part of universal peripheral connector 10. VGA port 65 is used to connect to peripherals such as a monitor 67 or a projector 69.

Other ports could also exist on universal peripheral connector 10 to accommodate peripherals that do not use either USB or VGA ports.

Examples of universal serial bus peripherals 20 could include storage devices 70, printers 72, external drives 74, cameras 76, or keyboards 78. Other devices are contemplated to also be within the scope of the present application, and the application is not limited by the specific type of peripheral used.

In operation, a universal peripheral connector 10 is connected to a mobile data device 15 through USB port 30. Mobile data device driver 32 is used to establish communication with mobile data device 15 and UPC USB controls software communicates with microprocessor 34 to control a USB host controller 36 to a control USB host controller 34. If a peripheral is connected to USB port 60, USB host controller 34 attempts to determine the appropriate driver for the peripheral. It looks in active driver module 40 to determine whether the active driver is located on the universal peripheral connector. If the relevant driver is not located within the active driver module, universal peripheral connector 10 asks mobile data device 15 for the appropriate driver.

Mobile data device 15 then looks in its cached driver storage 52 to determine whether the appropriate driver exists on the mobile data device. If the cached driver storage 52 does not contain the appropriate driver, mobile data device 15 uses an air interface to obtain the appropriate device driver. The air interface 80 can thus be used to obtain a driver from driver repository 82 which stores drivers for the UPC operating system in its storage 84. It can also be used to obtain client applications 86.

The appropriate driver is then sent over the air back to mobile data device 15 which then can send the driver to USB host controller 34. Microprocessor 36 could optionally tell the universal peripheral connector to store the driver in its active driver storage.

Once the device is connected to the universal peripheral connector and to a peripheral, the client application 54 can be used to communicate with the peripheral device. For example, if the mobile data device is being used for email and the user connects the mobile data device to a printer to print out the email, the mail application can include a print option. The print option could send the data to the printer through USB port 30 and USB port 60. One skilled in the art will realize that various options exist for sending data to a peripheral device and these would be known to those skilled in the art.

In the above printing example, the mobile data device could for example use TCP/IP for printing. The email program could include a local loopback interface in which the application printed to a port with the address 127.0.0.n where n is a number between 0 and 255. The print driver could look to this port and send the data on this port through the USB connection. Other options could include, for example, FTP.

Figure 2:
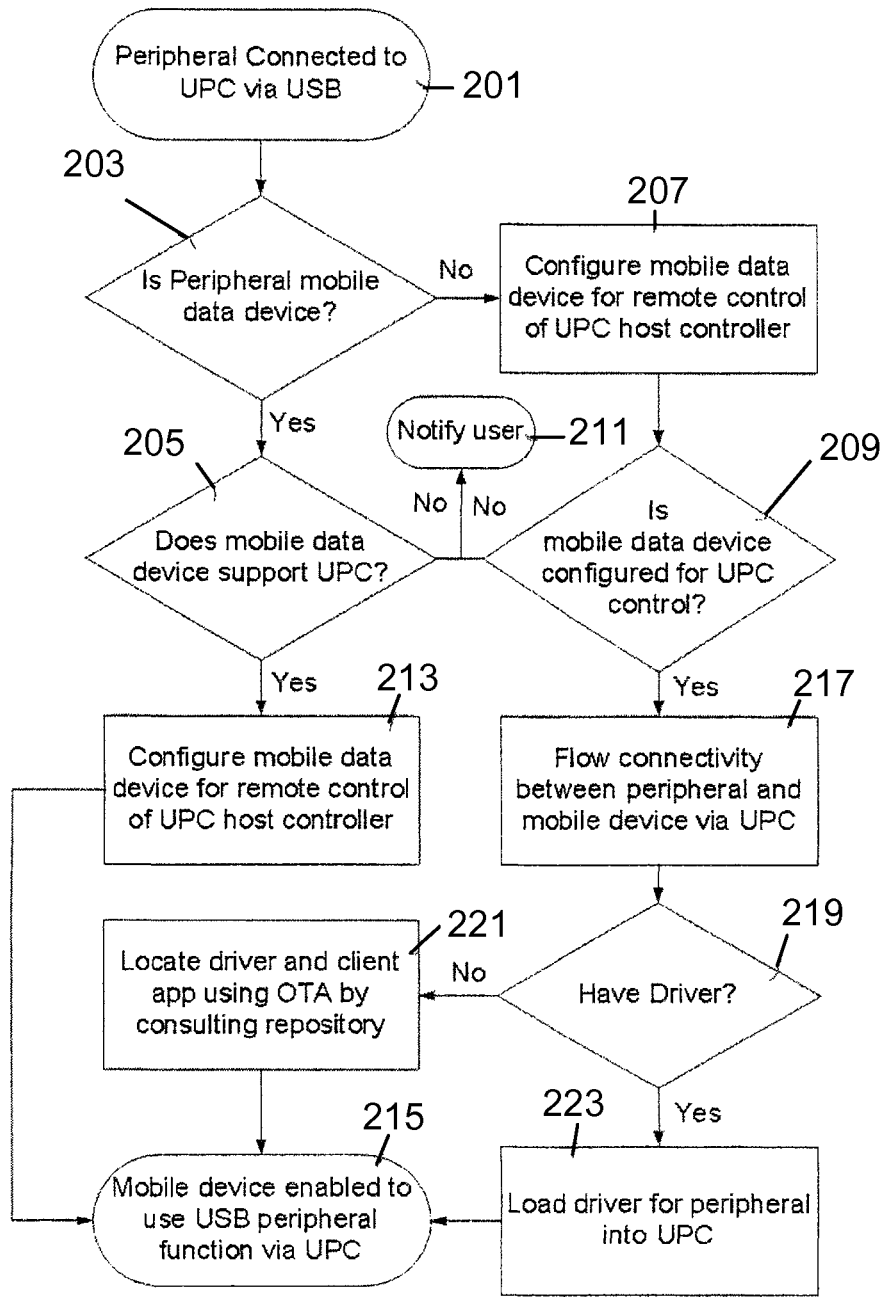
FIG. 2 is a flow chart of a method of connecting a universal peripheral connector to a peripheral device and to a mobile data device.

Reference is now made to FIG. 2. FIG. 2 shows a flow chart of the way that the universal peripheral connector connects to both the mobile data device and to a peripheral device. If a peripheral is connected to the UPC via USB in step 201, the UPC first checks to see whether the peripheral is a mobile data device in step 203. If yes, the peripheral next checks in step 205 whether the mobile data device supports the universal peripheral connector. If the peripheral device is not a mobile device as determined in step 203, the UPC next proceeds to step 207 in which it attempts to configure a mobile data device also connected to the UPC for remote control of the UPC host controller.

From 207, the UPC proceeds to step 209 in which it checks whether the mobile data device is configured for UPC control.

If in step 205 the device does not support the UPC or if in step 209 the mobile data device is not configured for UPC control, the UPC proceeds to step 211 in which a user notification is generated and the process ends.

If in step 205 the mobile data device does support the UPC, the UPC next proceeds to step 213 in which it attempts to configure the mobile data device for remote control of the UPC host controller, similar to step 207.

The UPC then proceeds from step 213 to step 215 in which a state is entered in which the mobile data device is now enabled to use a USB peripheral through the UPC.

From step 209, if the mobile data device is configured for UPC control, the UPC next proceeds to step 217 in which flow connectivity is established between the peripheral and the mobile device through the UPC.

The UPC next proceeds to step 219 in which it checks whether it or the mobile device has the driver for the peripheral that has just been attached. If it does not have the driver, then the driver is located in step 221 by obtaining it over the air and consulting the repository 84 as illustrated in FIG. 1.

From step 221, the UPC proceeds to step 215 in which the mobile data device is enabled to use the peripheral via the UPC.

If in step 219 the UPC discovers that it does have the driver, then the driver is loaded for the peripheral in step 223 and the UPC moves to step 215.

Figure 6:
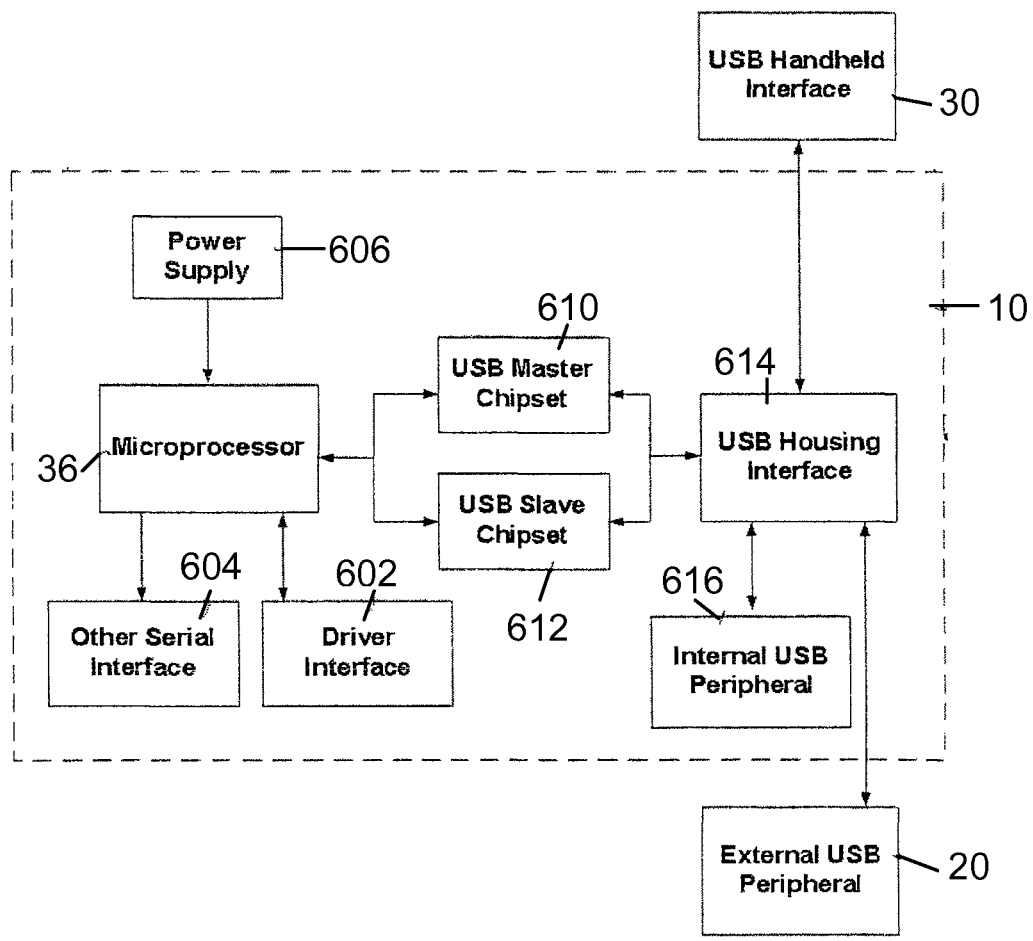
FIG. 6 is a block diagram of a further embodiment of a universal peripheral device.

Reference is now made to FIG. 6. FIG. 6 shows an alternative embodiment of a universal peripheral connector 10 which communicates through USB port 30 with a mobile data device 15 and through a USB port 60 to a peripheral device.

In the alternative embodiment of FIG. 6, a microprocessor 36 communicates with a driver interface 602 which may or may not be the same as active driver module 40.

Microprocessor 36 further communicates with other serial interfaces 604 which could include the VGA interface or other interfaces know to those skilled in the art. A power supply 606 supplies power to UPC 10.

Microprocessor 36 further communicates with a USB master chip set 610 and USB slave chip set 612. In this way, UPC 10 can either be the master or slave for each of the USB drives. Master and slave are also referred to as host end device in this specification.

Master chip set 610 and slave chip set 612 interact with USB housing interface 614 which could be the same as USB host controller 34 as seen in FIG. 1. USB housing interface then drive USB interface 30 and USB interface 60. USB housing interface 614 further is adapted to communicate with an internal USB peripheral 616 if required.

Figure 5:
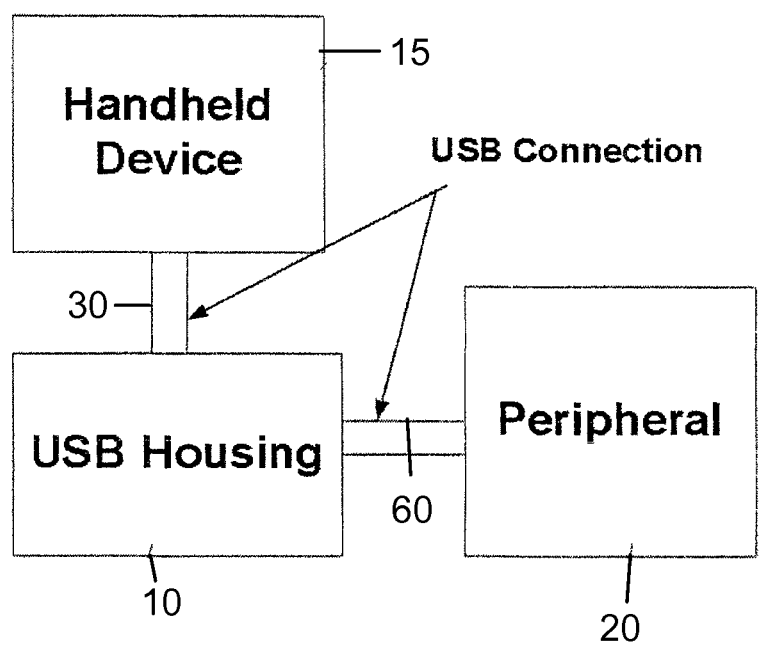
FIG. 5 is a high level diagram showing the USB housing connected to the mobile data device and the peripheral device.

As will be appreciated by those skilled in the art, the universal peripheral connector 10 needs to be positioned between the handheld device and the peripheral. This can be accomplished in several ways. As seen in FIG. 5, USB housing, which is the universal peripheral connector 10, is connected to peripheral 20 through a USB connection 60 and a handheld device 15 is connected through a USB port 30.

Figure 4:
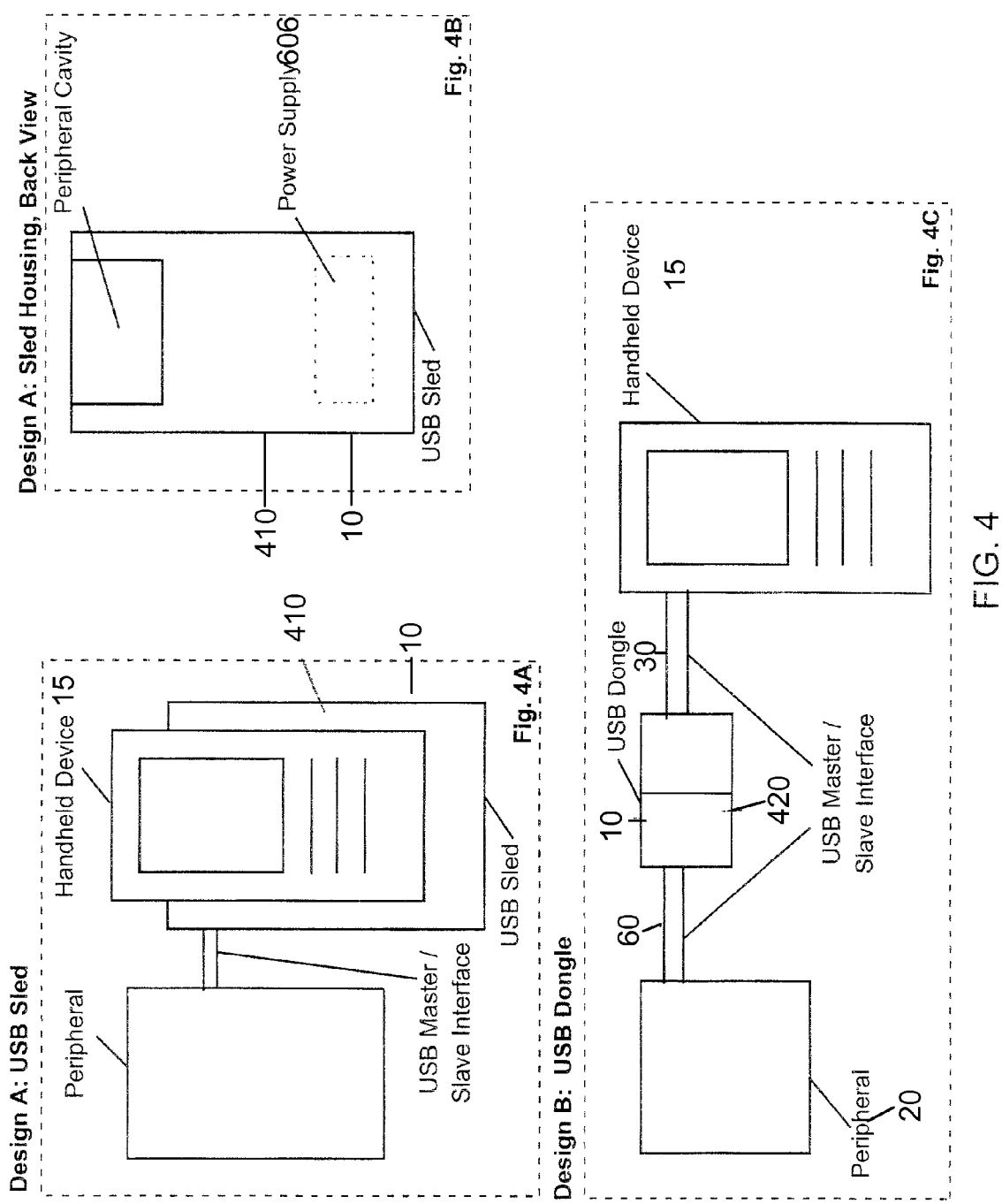
FIG. 4A is an exemplary USB sled that a mobile data device can be placed into.
FIG. 4B is a rear view of the USB sled of FIG. 4A.
FIG. 4C is an alternative embodiment using a USB dongle or USB peripheral device to connect the handheld device to the peripheral.

Reference is now made to FIG. 4. UPC 10 can have several configurations. As seen in FIG. 4A, UPC 10 can be a sled 410. In this case, handheld device 15 is inserted into the sled and a connector within sled 410 is adapted to connect to the USB port of handheld device 15.

Various ports within USB sled 410 can be used to connect to peripherals through a standard USB cable. Alternatively, as seen in FIG. 4B, the peripheral can fit into a cavity 415 specially adapted for that peripheral.

As with the device in FIG. 6, a power supply 606 is provided to the sled 410. This can be either an external power supply or an internal supply such as batteries. In a further alternative configuration as seen in FIG. 4C, a UPC 10 can be a dongle 420. Dongle 420 is adapted to connect to handheld device 15 and peripheral 20 through USB cables using ports 30 and 60 as described above. The power supply in this case could be an external power supply or batteries within the dongle 420.

Figure 3:
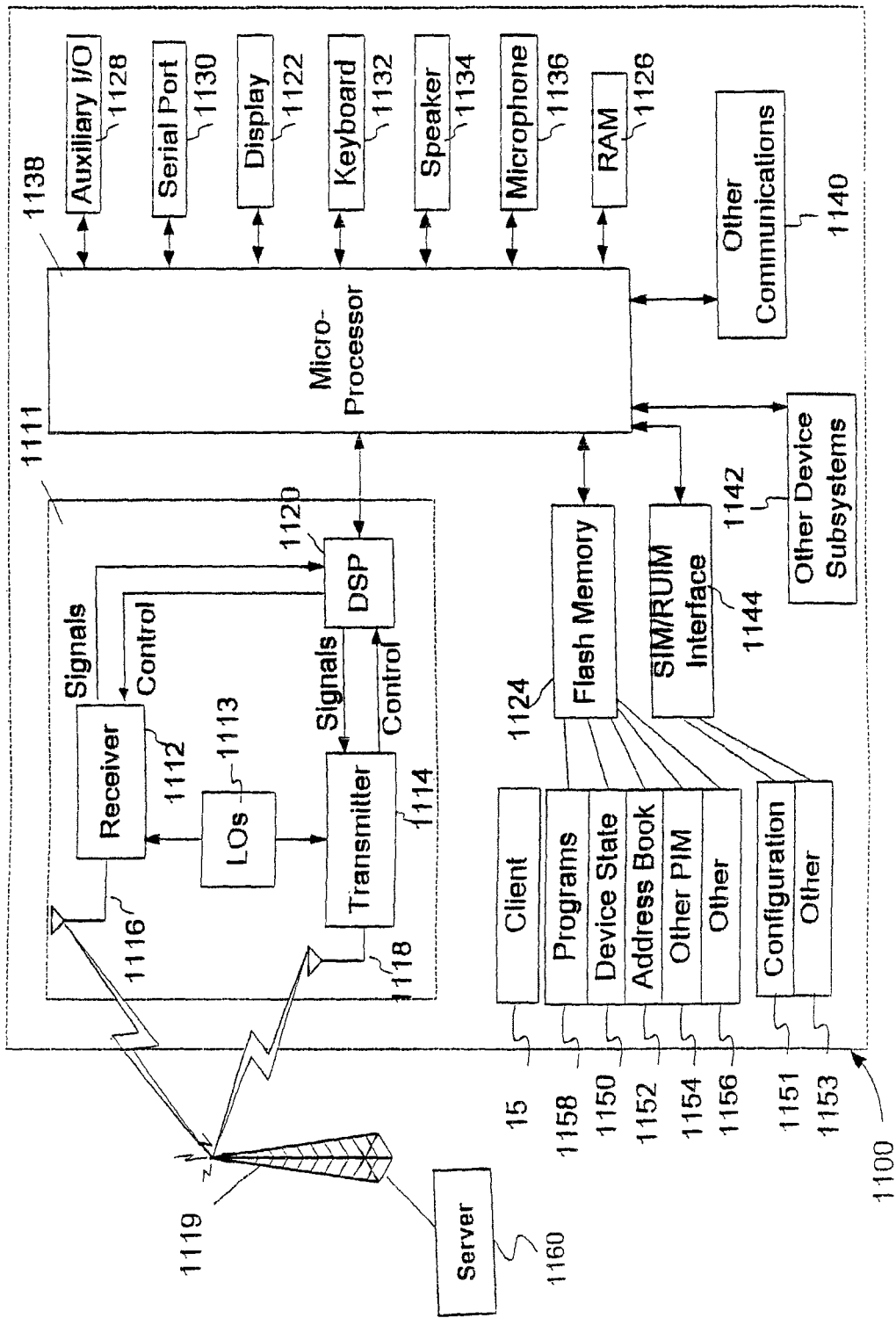
FIG. 3 is a block diagram of an exemplary mobile data device that can be used with the present apparatus and method.

As will be appreciated by those in the art, handheld device 10 can consist of various handheld devices, including telephones, personal digital assistants, pagers, or other mobile data devices. The above is not meant to be limited to any specific mobile device. Referring to FIG. 3, an exemplary mobile device that can be used in accordance with the present apparatus and method is described.

FIG. 3 is a block diagram illustrating a host mobile station including preferred embodiments of the techniques of the present application. Mobile station 1100 is preferably a two-way wireless communication device having at least voice and data communication capabilities. Mobile station 1100 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile device 1100 is enabled for two-way communication, it will incorporate a communication subsystem 1111, including both a receiver 1112 and a transmitter 1114, as well as associated components such as one or more, preferably embedded or internal, antenna elements 1116 and 1118, local oscillators (LOs) 1113, and a processing module such as a digital signal processor (DSP) 1120. As will be apparent to those skilled in the field of communications, the particular design of the communication subsystem 1111 will be dependent upon the communication network in which the device is intended to operate. For example, mobile station 1100 may include a communication subsystem 1111 designed to operate within the Mobitex™ mobile communication system, the DataTAC™ mobile communication system, GPRS network, UMTS network, EDGE network or CDMA network.

Network access requirements will also vary depending upon the type of network 1119. For example, in the Mobitex and DataTAC networks, mobile station 1100 is registered on the network using a unique identification number associated with each mobile station. In UMTS and GPRS networks, and in some CDMA networks, however, network access is associated with a subscriber or user of mobile station 1100. A GPRS mobile station therefore requires a subscriber identity module (SIM) card in order to operate on a GPRS network, and a RUIM in order to operate on some CDMA networks. Without a valid SIM/RUIM card, a GPRS/UMTS/CDMA mobile station may not be fully functional. Local or non-network communication functions, as well as legally required functions (if any) such as emergency calling, may be available, but mobile station 1100 will be unable to carry out any other functions involving communications over the network 1100. The SIM/RUIM interface 1144 is normally similar to a card-slot into which a SIM/RUIM card can be inserted and ejected like a diskette or PCMCIA card. The SIM/RUIM card can have approximately 64K of memory and hold many key configuration 1151, and other information 1153 such as identification, and subscriber related information.

When required network registration or activation procedures have been completed, mobile station 1100 may send and receive communication signals over the network 1119. Signals received by antenna 1116 through communication network 1119 are input to receiver 1112, which may perform such common receiver functions as signal amplification, frequency down conversion, filtering, channel selection and the like, and in the example system shown in FIG. 3, analog to digital (A/D) conversion. A/D conversion of a received signal allows more complex communication functions such as demodulation and decoding to be performed in the DSP 1120. In a similar manner, signals to be transmitted are processed, including modulation and encoding for example, by DSP 1120 and input to transmitter 1114 for digital to analog conversion, frequency up conversion, filtering, amplification and transmission over the communication network 1119 via antenna 1118. DSP 1120 not only processes communication signals, but also provides for receiver and transmitter control. For example, the gains applied to communication signals in receiver 1112 and transmitter 1114 may be adaptively controlled through automatic gain control algorithms implemented in DSP 1120.

Network 1119 may further communicate with multiple systems, including a server 1160 and other elements (not shown). For example, network 1119 may communicate with both an enterprise system and a web client system in order to accommodate various clients with various service levels.

Mobile station 1100 preferably includes a microprocessor 1138 which controls the overall operation of the device. Communication functions, including at least data and voice communications, are performed through communication subsystem 1111. Microprocessor 1138 also interacts with further device subsystems such as the display 1122, flash memory 1124, random access memory (RAM) 1126, auxiliary input/output (I/O) subsystems 1128, serial port 1130, keyboard 1132, speaker 1134, microphone 1136, a short-range communications subsystem 1140 and any other device subsystems generally designated as 1142.

Some of the subsystems shown in FIG. 3 perform communication-related functions, whereas other subsystems may provide "resident" or on-device functions. Notably, some subsystems, such as keyboard 1132 and display 1122, for example, may be used for both communication-related functions, such as entering a text message for transmission over a communication network, and device-resident functions such as a calculator or task list.

Operating system software used by the microprocessor 1138 is preferably stored in a persistent store such as flash memory 1124, which may instead be a read-only memory (ROM) or similar storage element (not shown). Those skilled in the art will appreciate that the operating system, specific device applications, or parts thereof, may be temporarily loaded into a volatile memory such as RAM 1126. Received communication signals may also be stored in RAM 1126. Further, a unique identifier is also preferably stored in read-only memory.

As shown, flash memory 1124 can be segregated into different areas for both computer programs 1158 and program data storage 1150, 1152, 1154 and 1156. These different storage types indicate that each program can allocate a portion of flash memory 1124 for their own data storage requirements. Microprocessor 1138, in addition to its operating system functions, preferably enables execution of software applications on the mobile station. A predetermined set of applications that control basic operations, including at least data and voice communication applications for example, will normally be installed on mobile station 1100 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 1119. In a preferred embodiment, the PIM data items are seamlessly integrated, synchronized and updated, via the wireless network 1119, with the mobile station user's corresponding data items stored or associated with a host computer system. Further applications may also be loaded onto the mobile station 1100 through the network 1119, an auxiliary I/O subsystem 1128, serial port 1130, short-range communications subsystem 1140 or any other suitable subsystem 1142, and installed by a user in the RAM 1126 or preferably a non-volatile store (not shown) for execution by the microprocessor 1138. Such flexibility in application installation increases the functionality of the device and may provide enhanced on-device functions, communication-related functions, or both. For example, secure communication applications may enable electronic commerce functions and other such financial transactions to be performed using the mobile station 1100. These applications will however, according to the above, in many cases need to be approved by a carrier.

In a data communication mode, a received signal such as a text message or web page download will be processed by the communication subsystem 1111 and input to the microprocessor 1138, which preferably further processes the received signal for output to the display 1122, or alternatively to an auxiliary I/O device 1128. A user of mobile station 1100 may also compose data items such as email messages for example, using the keyboard 1132, which is preferably a complete alphanumeric keyboard or telephone-type keypad, in conjunction with the display 1122 and possibly an auxiliary I/O device 1128. Such composed items may then be transmitted over a communication network through the communication subsystem 1111.

For voice communications, overall operation of mobile station 1100 is similar, except that received signals would preferably be output to a speaker 1134 and signals for transmission would be generated by a microphone 1136. Alternative voice or audio I/O subsystems, such as a voice message recording subsystem, may also be implemented on mobile station 1100. Although voice or audio signal output is preferably accomplished primarily through the speaker 1134, display 1122 may also be used to provide an indication of the identity of a calling party, the duration of a voice call, or other voice call related information for example.

Serial port 1130 in FIG. 3 would normally be implemented in a personal digital assistant (PDA)-type mobile station for which synchronization with a user's desktop computer (not shown) may be desirable. Such a port 1130 would enable a user to set preferences through an external device or software application and would extend the capabilities of mobile station 1100 by providing for information or software downloads to mobile station 1100 other than through a wireless communication network. The alternate download path may for example be used to load an encryption key onto the device through a direct and thus reliable and trusted connection to thereby enable secure device communication.

Other communications subsystems 1140, such as a short-range communications subsystem, is a further optional component which may provide for communication between mobile station 1100 and different systems or devices, which need not necessarily be similar devices. For example, the subsystem 1140 may include an infrared device and associated circuits and components or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A universal peripheral connector apparatus comprising:
a first port configured to connect to a host device;
a second port configured to connect to a peripheral device;
an internal memory configured to store a plurality of peripheral drivers;
a universal serial bus (USB) host controller;
a microprocessor configured to:
   select from the plurality of peripheral drivers a driver configured to drive the peripheral device;
   receive instructions via the first port and to control the peripheral device with the selected driver via the second port based on said instructions and
   control the USB host controller,
wherein at least one of the first port and the second port is a USB port.

2. The universal peripheral connector of claim 1, wherein the host controller is configured to control the USB port.

3. The universal peripheral connector of claim 2, wherein the host controller comprises at least one of a master chipset and slave chipset.

4. The universal peripheral connector of claim 1, wherein the peripheral drivers are configured to drive the peripheral devices selected from the group comprising printers, facsimile machines, computers, digital cameras, portable memory devices, portable music players, scanners, barcode scanners, monitors, projectors, keyboards, and media writers.

5. The universal peripheral connector of claim 1, wherein both the first port and the second port are USB ports.

6. The universal peripheral connector apparatus of claim 1, wherein the universal peripheral connector is a dongle.

7. The universal peripheral connector apparatus of claim 1, wherein the universal peripheral connector is a dongle connected to said host device through a USB cable.

* * * * *